J. H. GRUBB.
Apparatus for Treating Coffee.
No. 155,300. Patented Sept. 22, 1874.
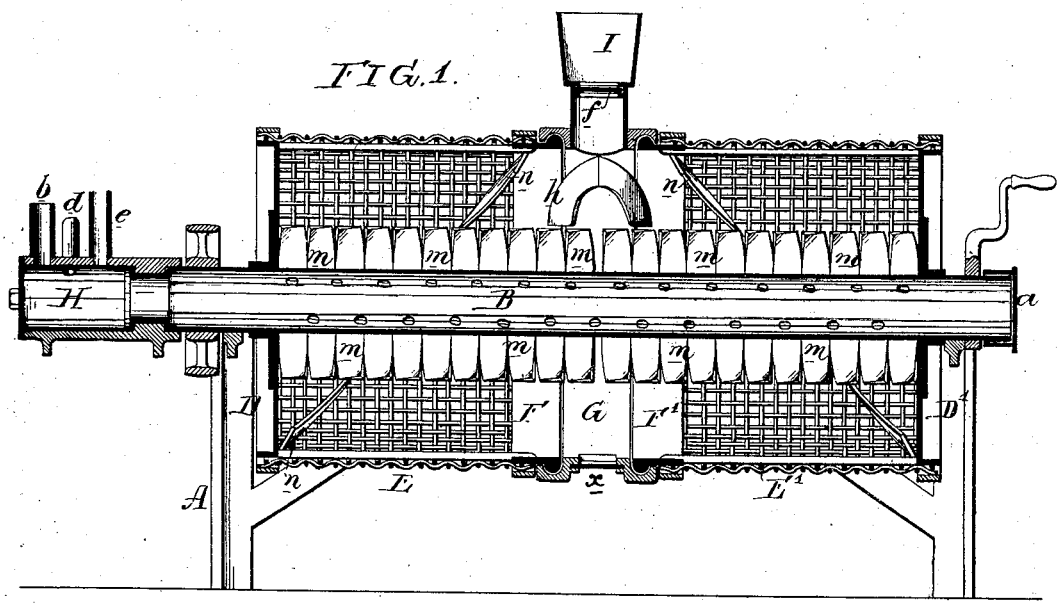
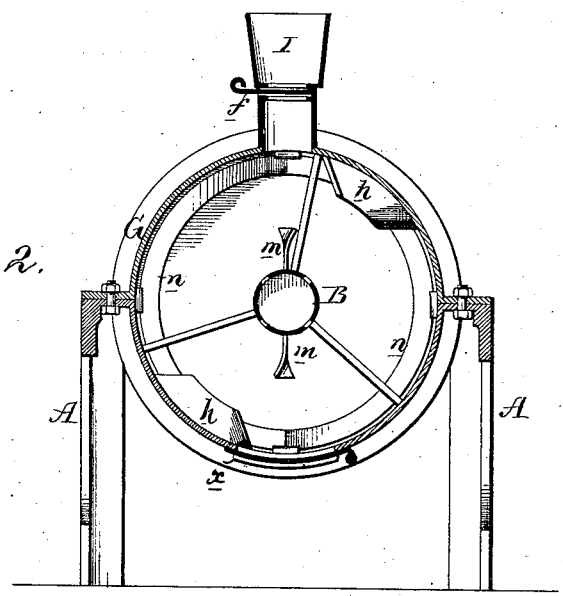
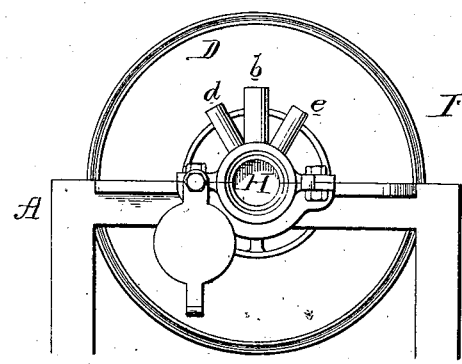
Witnesses,
Hubert Howson
Harry Smith
John H. Grubb
by his Attys,
Howson and Son

UNITED STATES PATENT OFFICE.

JOHN H. GRUBB, OF PHILADELPHIA, PENNSYLVANIA, ASSIGNOR, BY MESNE ASSIGNMENT, TO GEORGE BOYD, OF SAME PLACE.

IMPROVEMENT IN APPARATUS FOR TREATING COFFEE.

Specification forming part of Letters Patent No. 155,300, dated September 22, 1874; application filed March 3, 1874.

*To all whom it may concern:*

Be it known that I, JOHN H. GRUBB, of Philadelphia, Pennsylvania, have invented an Apparatus for Treating Coffee, of which the following is a specification:

The object of my invention is to rapidly clean and impart a polish and an impervious coating to roasted coffee by the mechanism and appliances illustrated in the vertical section, Figure 1, transverse section, Fig. 2, and end view, Fig. 3, of the accompanying drawing, in which—

A represents a frame in bearings, on the opposite ends of which revolves a perforated tube, B, and to the latter are secured two flanged plates or disks, D D'. One end of a hollow cylinder, E, of wire-gauze or perforated plate, is secured to the flanged edge of the disk D, and the opposite end to a ring, F, so adapted to an annular internal groove in the ring G that it can revolve freely within the latter, which is secured to the frame. In like manner a hollow cylinder, E', of wire-gauze or perforated plate, is secured, at one end, to the disk D', and at the opposite end to a ring, F', which can revolve freely within the stationary ring G. One end of the tube B is furnished with a detachable cap, a, the other end revolving within a reservoir, H, secured to the frame. Pipes b d e, furnished with suitable cocks, communicate with the reservoir H, so that a blast of hot air may be introduced into the reservoir through one pipe, steam through another, and a composition (referred to hereafter) through a third, as circumstances may require.

A batch of coffee, fresh from the roaster, and still hot, is introduced into the revolving cylinders E E' through a central hopper, I, attached to the ring G, the hopper being closed by a suitable gate, f, after the whole batch of coffee has been introduced.

The first action to which the coffee is subjected within the cylinders is the lateral disposal of the berries, in both directions from the stationary ring G, by any desired number of deflectors, h, secured to the rings F F of the two cylinders, each deflector consisting of two inclined plates, meeting at a comparatively sharp edge, so that, as they revolve with the cylinders, and pass through the mass of the coffee, the berries must be dispersed laterally, some into one cylinder, and others into the other cylinder; for it is essential that the accumulation of masses of berries in the stationary ring should be prevented, otherwise they would deteriorate in quality, as continued motion is necessary to prevent the spoiling of hot, newly-roasted coffee-berries.

It is desirable, in the first instance, to remove from the coffee the light fibrous matter which adheres to the slit in each berry, and, at the same time, to impart a smooth surface to the same. These duties are accomplished partly by the inclined vanes m, attached to the central perforated tube B, partly by spiral plates n, secured to the interior of both cylinders, but mainly by the rotation of the cylinders themselves, a constant lateral movement of the mass being effected by the plates n and vanes, and such an attrition of the berries against each other and against the cylinder taking place that all excrescences are removed from the surface, and the fibrous matter above referred to is dislodged, the waste particles passing through the meshes or perforations of the cylinders; or, if they cannot be disposed of in this manner with sufficient rapidity, a blast of heated air may be introduced into the reservoir H through one of the pipes, and then into the tube B, and, through its perforations, into the batch of coffee in the cylinders. After this preparatory cleansing of the coffee, which is accomplished in a very short time, and before it becomes cold, the coating-solution for which reissued Letters Patent No. 5,383 were granted to John T. Cooke, April 29, 1873, is forced into the central tube B, and thence through its perforations into the coffee while the heated berries are in motion, so that every berry receives a proper coating, which imparts to it a finished surface, and prevents the loss of flavor. This operation having been completed, the batch of coffee is removed from the cylinders through an opening at the bottom of the stationary ring G, the said opening being provided with a suitable gate, x, after which a new batch of fresh-roasted coffee may be introduced into the cylinders; or, if the cylinders and their appliances require cleansing, steam or water may be introduced, through one of the pipes, into the reservoir H, from which it will pass into the tube B, and through its perforations, or directly through the tube, after removing its cap a.

I claim as my invention—

1. The combination, substantially as described, of the rotating perforated tube B, its cylinders E and E', of wire netting or gauze, or perforated plate, and the central stationary ring G, with inlet and outlet openings.

2. The combination of the rotating cylinders E E', the deflectors h, attached to the same, and the stationary ring G.

3. The combination of the perforated tube and its vanes m with the spiral plates n in the cylinders E E'.

In testimony whereof I have signed my name to this specification in the presence of two subscribing witnesses.

JOHN H. GRUBB.

Witnesses:
 WM. A. STEEL,
 HARRY SMITH.